(12) United States Patent
Mahmoud

(10) Patent No.: US 11,308,700 B2
(45) Date of Patent: Apr. 19, 2022

(54) AUGMENTED REALITY VISUALIZATION OF UNDERGROUND PIPELINES USING GEOSPATIAL DATABASES AND KM MARKERS

(71) Applicant: Saudi Arabian Oil Company, Dhahran (SA)

(72) Inventor: Wessam H. Mahmoud, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/840,936

(22) Filed: Apr. 6, 2020

(65) Prior Publication Data

US 2021/0312711 A1  Oct. 7, 2021

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 2207/30204* (2013.01); *G06T 2207/30244* (2013.01)

(58) Field of Classification Search
CPC .................... G06T 19/006; G06T 2207/30204
See application file for complete search history.

(56) References Cited

U.S. PATENT DOCUMENTS 6,094,625 A * 7/2000 Ralston ................... G06F 3/011
                                                             702/150
7,376,517 B2  5/2008 Rickett
8,670,939 B2  3/2014 Yoon et al.
8,976,625 B2  3/2015 Blias et al.
9,336,629 B2 * 5/2016 Finn ......................... G06K 9/22
9,367,963 B2 * 6/2016 Finn .................... G06K 9/00671
(Continued)

FOREIGN PATENT DOCUMENTS

WO  2015187142  12/2015

OTHER PUBLICATIONS

Billinghurst et al., "A Survey of Augmented Reality," Foundations and Trends in Human-Computer Interaction, 2014, 8(2-3): 73-272.
(Continued)

*Primary Examiner* — Ryan R Yang
(74) *Attorney, Agent, or Firm* — Fish & Richardson P.C.

(57) ABSTRACT

Systems and methods include a method for presenting an augmented reality (AR) display. Kilometer (KM) markers nearest a location are identified using an AR system. Virtual representations of the KM markers are superimposed onto a real-time displayed scene of the location captured by a camera. Fiducial information of a fiducial marker of a pipeline associated with a user-selected KM marker is obtained using KM marker information of a user-selected KM marker. Segment coordinates of the pipeline are obtained using the fiducial information. A relative position of the pipeline relative to the real-time displayed scene captured by the camera is determined. The relative position of the pipeline is determined based on a direction in which the camera is pointed, coordinates of the camera, and the segment coordinates of the pipeline. A 3D model of the pipeline is superimposed onto the real-time displayed scene captured by the camera.

20 Claims, 5 Drawing Sheets

(56) References Cited

U.S. PATENT DOCUMENTS

| | | | |
|---|---|---|---|
| 9,619,944 B2* | 4/2017 | Finn | G06K 9/3208 |
| 9,952,192 B2 | 4/2018 | Donzier et al. | |
| 10,288,755 B2 | 5/2019 | Cordery | |
| 10,294,771 B2 | 5/2019 | Donzier et al. | |
| 11,079,522 B1* | 8/2021 | Dong | G06V 10/751 |
| 2004/0104935 A1* | 6/2004 | Williamson | G06T 15/20 |
| | | | 715/757 |
| 2010/0203040 A1 | 4/2010 | Broadbent | |
| 2014/0210856 A1* | 7/2014 | Finn | G06K 9/00671 |
| | | | 345/633 |
| 2015/0206352 A1* | 7/2015 | Murakami | G06K 9/00671 |
| | | | 345/633 |
| 2018/0218538 A1* | 8/2018 | Short | G06F 3/011 |
| 2018/0320514 A1 | 11/2018 | Felkl et al. | |
| 2019/0139320 A1* | 5/2019 | Davies | G01B 5/004 |
| 2019/0293814 A1 | 9/2019 | Horne | |
| 2019/0339408 A1 | 11/2019 | Davies | |
| 2020/0097618 A1* | 3/2020 | Agouridis | G06F 30/18 |
| 2020/0126306 A1* | 4/2020 | Aguoridis | G06F 3/011 |
| 2020/0160607 A1* | 5/2020 | Kjallstrom | G06T 19/006 |

OTHER PUBLICATIONS

Nasri, "Engineering Standard: SAES-L-450: Construction of On-Land and Near-Shore Pipelines," Saudi Aramco, Nov. 2012, 30 pages.

Chalk, "Increasing the accuracy of location-based augmented reality applications using object recognition," Sep. 2017, 61 pages.

Chen et al., "Single-Image Distance Measurement by A Smart Mobile Device," IEEE Transactions on Cybernetics, Dec. 2017, 47(12): 13 pages.

GIS Fundamentals, A First Text on Geographic Information Systems, 5th edition, Chapter 4: Maps and Data Entry, Coordinates Transformation, Mar. 2016, pp. 170-180.

Guo et al., "Application of Augmented Reality GIS in Architecture," Resources and Environment Science School, Wuhan University; ISPRS VIII, 2008, 6 pages.

hitl.washington.edu [online], "ARToolkit Tutorial 2: Camera and Marker Relationships," available on or before Dec. 5, 2005, via Internet Archive: Wayback Machine URL <https://web.archive.org/web/20051215025719/http://www.hitl.washington.edu/artoolkit/documentation/tutorialcamera.htm>, retrieved on Jun. 3, 2020, retrieved from URL <http://www.hitl.washington.edu/artoolkit/documentation/tutorialcamera.htm> , 5 pages.

Stylianidis et al., "LBS Augmented Reality Assistive System for Utilities Infrastructure Management Through GALILEO and EGNOS," The International Archives of the Photogrammetry, Remote Sensing and Spatial Sciences, Jul. 2016, vol. XLI-B1, 7 pages.

Talmaki et al., "Geospatial Databases and Augmented Reality Visualization for Improving Safety in Urban Excavation Operations," University of Michigan, Department of Civil and Environmental Engineering; Construction Research Congress 2010, 10 pages.

Carey et al., "Analysis of water hammer signatures for fracture diagnostics," SPE-174866, Presented at the SPE Annual Technical Conference and Exhibition, Sep. 28-30, 2015; Society of Petroleum Engineers, 2015, 26 pages.

Cheng et al., "Comparison of Q-estimation methods: an update," CREWES Research Report, 2013, 25: 1-38.

Cheng et al., "Estimation of Q: a comparison of different computational methods," GeoConvention 2013: Integration, 2013, 4 pages.

Dunham et al. "Hydraulic fracture conductivity inferred from tube wave reflections," In SEG Technical Program Expanded Abstracts, Society of Exploration Geophysicists, 2017, pp. 947-952.

Gupta, "Q Factor Analysis with Pilot Trace," HRDH 0697/ HDRH 0933, Saudi Aramco, Dec. 2016, 14 pages.

Liang et al., "Hydraulic fracture diagnostics from Krauklis-wave resonance and tube-wave reflections," Geophysics, May-Jun. 2017, 82(3): D171-D186.

Tang et al., "A dynamic model for fluid flow in open borehole fractures," Journal of Geophysical Research: Solid Earth, Jun. 1989, 94(B6): 7567-7576.

Tonn et al., "The determination of the seismic quality factor Q from VSP data: a comparison of different computational methods," Geophsical Prospecting, 1991, 39: 1-27.

Kaddioui et al., "Uses of augmented reality for urban utilities management," Matec Web of Conferences, Jan. 2019, 295, 8 pages.

Schall et al., "Vidente—3D visualization of underground infrastructure using handheld augmented reality," Geohydroinformatics: Integrating GIS and Water Engineering, Jan. 2010, 17 pages.

Zhao et al., "A mobile landmarks guide: outdoor augmented reality based on LOD and contextual device," Computer Science, Mar. 2012, 21 pages, English Translation.

PCT International Search Report and Written Opinion in International Appln. No. PCT/US2021/025966, dated Jul. 23, 2021, 15 pages.

* cited by examiner

AUGMENTED REALITY VISUALIZATION OF UNDERGROUND PIPELINES USING GEOSPATIAL DATABASES AND KM MARKERS

BACKGROUND

The present disclosure applies to displaying information about pipelines.

Pipeline kilometer (KM) markers (or KM posts) are used widely for providing information about the location of the underground pipelines. Pipeline operators use pipeline KM markers to obtain information about underground pipelines such as the pipeline name, type, and location. This information is important when reporting emergencies and seeking assistance in determining the location of the buried pipelines. Reading the KM marker information can be an inefficient method because the limited size of the plate of the pipeline marker provides it provides insufficient information about the pipeline. For example, pipeline operators can use pipeline KM markers to locate a specific pipeline segment and perform pipeline inspection and maintenance work in the field. Reading pipeline information manually from KM markers can be problematic. For example, some pipeline information on a KM marker can become obscured over the time. Also, extending a pipeline can require replacing all KM markers along the pipeline. Furthermore, reading the KM markers manually can provide limited information for the pipeline operators. Many solutions have been developed to replace the manual method for identifying and locating buried pipelines. These methods may include using quick response (QR) codes, radio frequency identification (RFID) technology, and magnetic locating technology.

SUMMARY

The present disclosure describes techniques that can be used for providing an augmented reality display that includes information about underground pipelines in an area. In some implementations, a computer-implemented method includes the following. One or more kilometer (KM) markers that are nearest a location are identified using an AR system. Virtual representations of the KM markers are superimposed by the AR system onto a real-time displayed scene of the location captured by a camera of the AR system. Fiducial information of a fiducial marker of a pipeline associated with a user-selected KM marker is obtained by the AR system using KM marker information of the user-selected KM marker. Segment coordinates of the pipeline are obtained by the AR system using the fiducial information. A relative position of the pipeline relative to the real-time displayed scene captured by the camera is determined by the AR system. The relative position of the pipeline is determined based on a direction in which the camera is pointed, coordinates of the camera, and the segment coordinates of the pipeline. A 3D model of the pipeline is superimposed by the AR system onto the real-time displayed scene captured by the camera.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages.

First, pipeline operators can be provided with information, including virtual reality displays, on their mobile devices identifying accurate locations of nearby buried pipelines. Second, pipeline operators can receive up-to-date, underground, nearby pipeline-related information on their mobile devices instead of reading more limited information on pipeline KM marker plates. Third, costs associated with modifying and maintaining information on pipeline markers, such as when extending pipelines, can be avoided or reduced. Fourth, the techniques can enable pipeline operators to more easily and accurately locate specific pipeline segments along a pipeline. Fifth, the techniques can be extended to determining locations by using phone numbers for a business or in an emergency.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
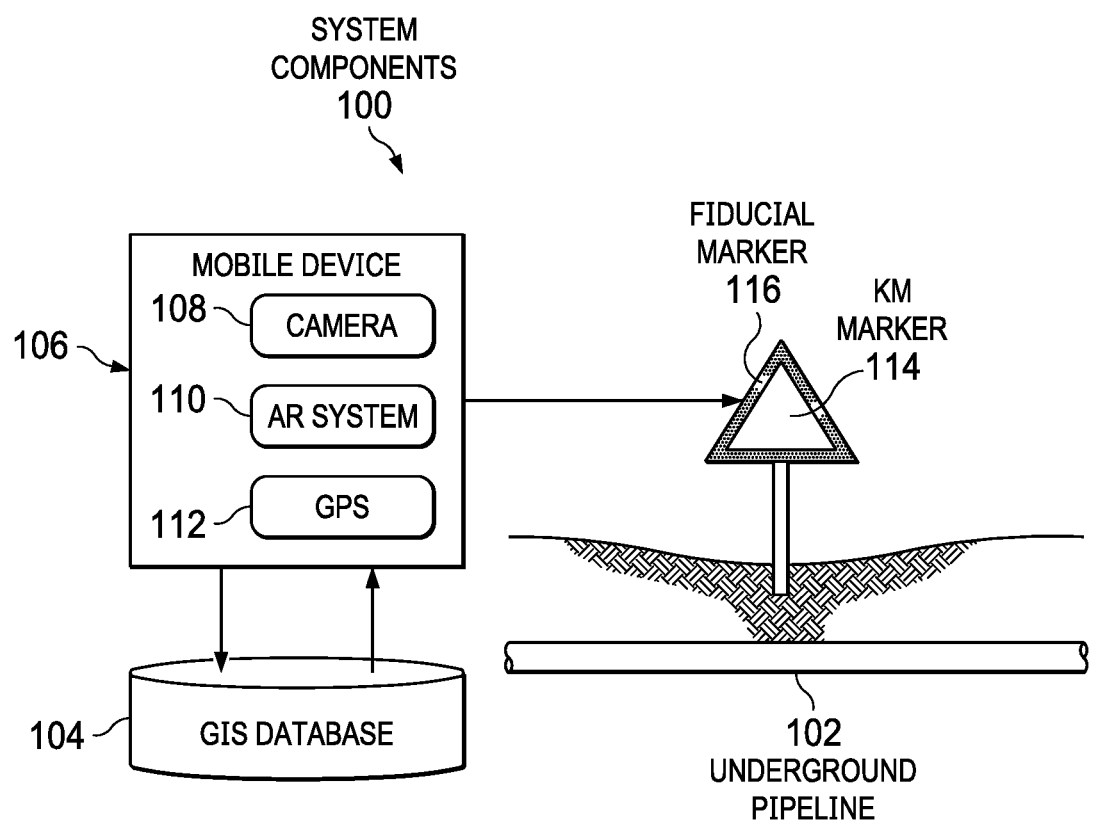
FIG. 1 is a block diagram showing an example of system components for providing an augmented reality, according to some implementations of the present disclosure.

The following detailed description describes techniques for providing an augmented reality (AR) display that includes information about underground pipelines in an area.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure can include the use of a combination of augmented reality technologies, smart phones or other mobile devices, pipeline kilometer (KM) markers, and a pipeline geographical information system (GIS) database. Pipeline and location information can be retrieved and visualized on a smart device without relying on the existing, such as letters, numbers, symbols, and codes, that are physically displayed on (and scannable from) pipeline KM markers. The techniques can be implemented, for example, in devices that are carried or worn (for example, as AR glasses) by people performing pipeline inspection and maintenance operations. The use of AR technology, including views of underground pipelines, can improve the efficiency of pipeline operators who perform pipeline inspection and maintenance work.

Marker-based AR and location-based service (LBS) technologies can enable pipeline operators to retrieve GIS information corresponding to buried pipelines. The information can be retrieved from a GIS database, for example, based on a current location of the pipeline operator, to locate at least the pipelines in close proximity to a pipeline operator, for example. The pipeline operators can command their AR device to superimpose this information and the accurate location of the buried pipeline on their mobile devices. The pipeline operators do not need to read the KM marker plate to obtain the information. The pipeline information displayed by the AR device, including a visual representation of the pipeline, can be superimposed on a line-of-sight view of the AR device.

The techniques described in the present disclosure can rely on existing objects, including using existing KM markers as fiducial markers. The GIS database can be accessed to retrieve the spatial information of the buried pipelines. The position of the buried pipelines relative to the fiducial marker coordinate system can provide improved accuracy over surveying equipment when overlaying a pipeline model on a display. The AR application can be configured to recognize the KM marker shape as a fiducial marker. The information displayed to a pipeline operator can be generated in real time without waiting, for example, surveying equipment and activities. The information provided to a pipeline operator can include information for one or more nearby pipelines among thousands of underground pipelines and utilities that a company may control worldwide.

In some implementations, LBS techniques can be used to search an existing GIS database to identify and locate facilities by using a GPS-equipped mobile devices. In addition, AR technologies can also be used, such as using AR software (or applications) executing on mobile devices for superimposing a virtual object (for example, underground pipeline) onto a real-world scene. For example, the term real-time can correspond to events that occur within a specified period of time, such as within one second or within milliseconds. Using LBS and AR technologies together can provide a great solution for pipeline operators to retrieve spatial information associated with underground pipelines.

FIG. 1 is a block diagram showing an example of system components 100 for providing an augmented reality, according to some implementations of the present disclosure. The augmented display can include display information about underground pipelines 102 in an area. The information can be accessed from an existing GIS database 104, for example. The information can be used to superimpose a three-dimensional (3D) model of buried pipeline in an area on a real-world scene. For example, a pipeline operator wearing or operating an AR device (for example, mobile device 106) can see computer-generated displays indicating locations of underground pipelines relative to the pipeline operator's line-of-sight. The mobile device 106 includes a camera 108, an AR system 110 (including AR software), and GPS capabilities 112. The camera 108 can be used to read KM markers 114.

In some implementations, pipeline KM marker plates can serve as fiducial markers 116. Using the fiduciary markers 116, the AR system 110 of the mobile device 106 can retrieve the updated information of the underground pipeline 102 and the KM marker 114 from the GIS database 104. Buried pipeline information that is obtained can be overlaid on the pipeline operator's screen (on the mobile device 106). The information can be more accurate and up-to-date than conventional techniques, for example, that simply rely on KM markers.

Using the techniques of the present disclosure, there is no need to print information on KM marker plates, since the information needed for an AR overlay can be accessed from a GIS database. Further, KM marker plates can serve as fiducial markers. The techniques can use GPS and electronic compass capabilities of a device's camera to determine an absolute position and orientation of an observer using the device. This can provide an improvement over conventional solutions, for example, that rely on external surveying devices. In some implementations, a device's GPS, gyroscope, and other features can be used as an initial step to determine the coordinates of a nearby pipeline. For example, and KM marker features and information in a GIS database can be searched using spatial queries such as "nearest from . . . " or "within N meters of . . . " The coordinates that are determined can be used to find a relative distances/positions (for example, in 3D space) between the KM marker and the pipeline. A relative position in the AR environment can be used to superimpose a hidden pipeline in a scene captured by the device's camera when the device's camera is pointed, for example, to a fiducial marker (for example, on a KM marker).

Figure 2:
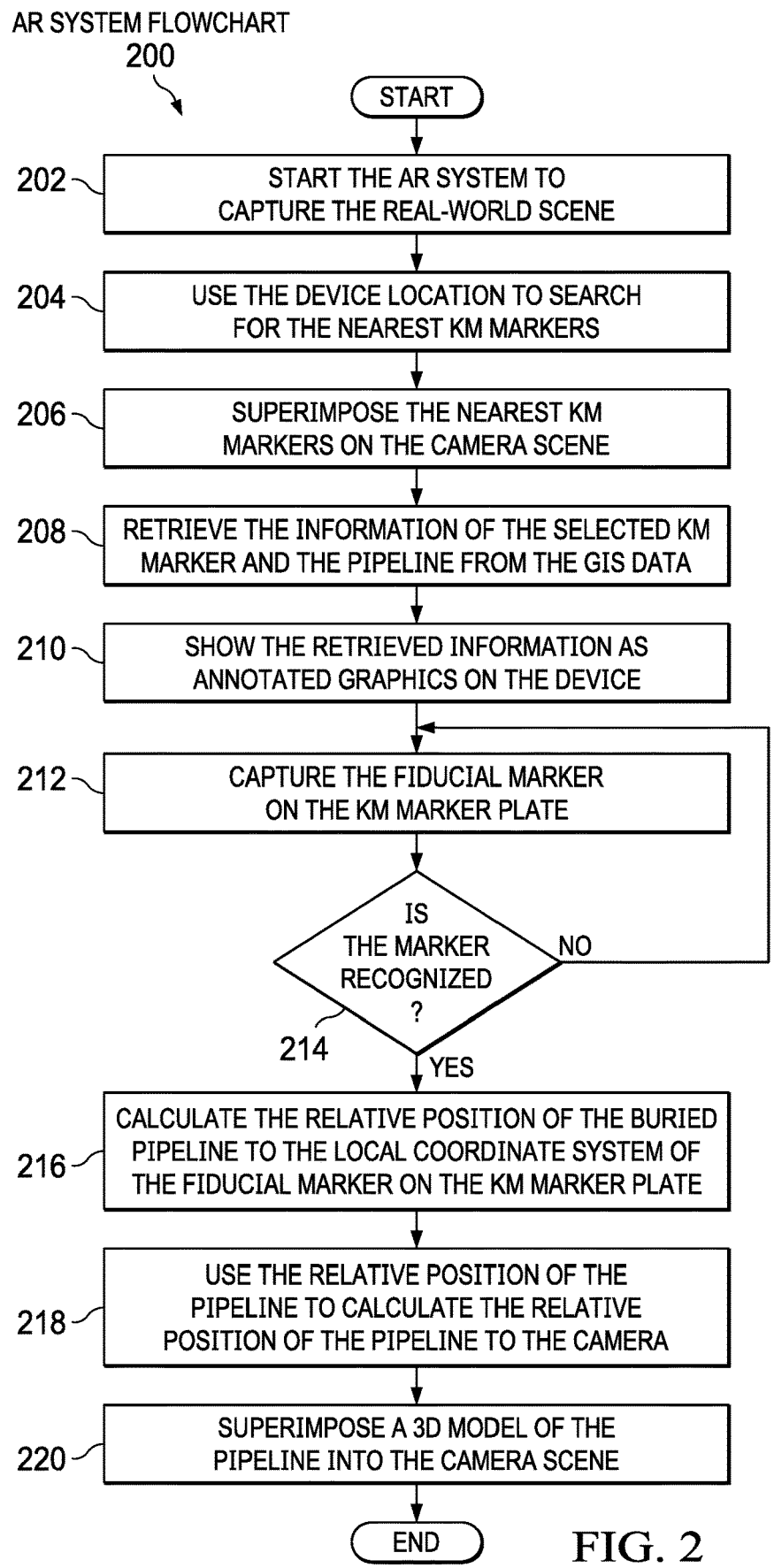
FIG. 2 is a flow diagram of an example of a workflow for providing an augmented reality display, according to some implementations of the present disclosure.

FIG. 2 is a flow diagram of an example of a workflow 200 for providing an augmented reality display, according to some implementations of the present disclosure. The augmented reality display can include information about underground pipelines in an area. The steps of the workflow 200 can happen automatically, without the pipeline operators needing to personally read the KM marker plates to get this information.

At 202, the AR system can be started for capturing a real-world scene. For example, pipeline operators can install and run AR applications on their mobile devices. The AR applications can be access the spatial location of the pipeline segments and the KM markers from the GIS database. In some cases, the GIS data for an area can be downloaded on mobile devices for offline use.

At 204, the AR system 110 can use the device's current location to search for the nearest KM markers. For example, an AR application of the AR system 110 can use a current location of the mobile device 106 to search the GIS database 104 for the nearest KM markers 114.

At 206, the nearest KM markers can be superimposed, for display to the user (pipeline operator) on the scene captured by the camera 108. As an example, KM markers 114 that result from a spatial query can be superimposed on the devices of the pipeline operator(s).

At 208, information of a selected KM marker can be retrieved. Also, information for the pipeline corresponding to the KM marker can be retrieved from the GIS database 104.

At 210, the retrieved information is shown as annotated graphics on the device. For example, a computer-generated outline of the pipeline can be superimposed on the line-of-sight view of the camera. The display can also include textual information associated with the pipeline.

Up until this point of the workflow 200, the AR is location-based. After a KM marker is determined to be near to the pipeline operators, marker-based AR is used.

At 212, the fiducial marker on the KM marker plate can be captured. For example, a pipeline operator can point their device's camera to capture the fiducial marker information on pipeline KM marker. This can occur, for example, when the KM marker plate serves as a fiducial marker. A fiduciary marker can be identified as such because the marker has a standard shape that is recognized by the device. For better recognition, KM markers can have square, triangular, or other standard-shaped borders. Moreover, a unique colorful symbol can be included on each pipeline KM marker plate to facilitate the AR recognition process.

At 214, a determination is made whether the marker is recognized. If not, then another attempt can be made to capture the fiducial marker at step 212.

At 216, the relative position of the buried pipeline that is relative to the fiducial marker on the KM marker plate is calculated. For example, once the fiducial marker on the KM marker plate is recognized by the AR application, the spatial location of the pipeline KM marker and the related pipeline segment can be retrieved from the GIS database. The AR application can use a spatial relationship (for example, the "nearest") to access the GIS database to retrieve information for the KM marker and the related nearby buried pipeline(s).

Figure 3:
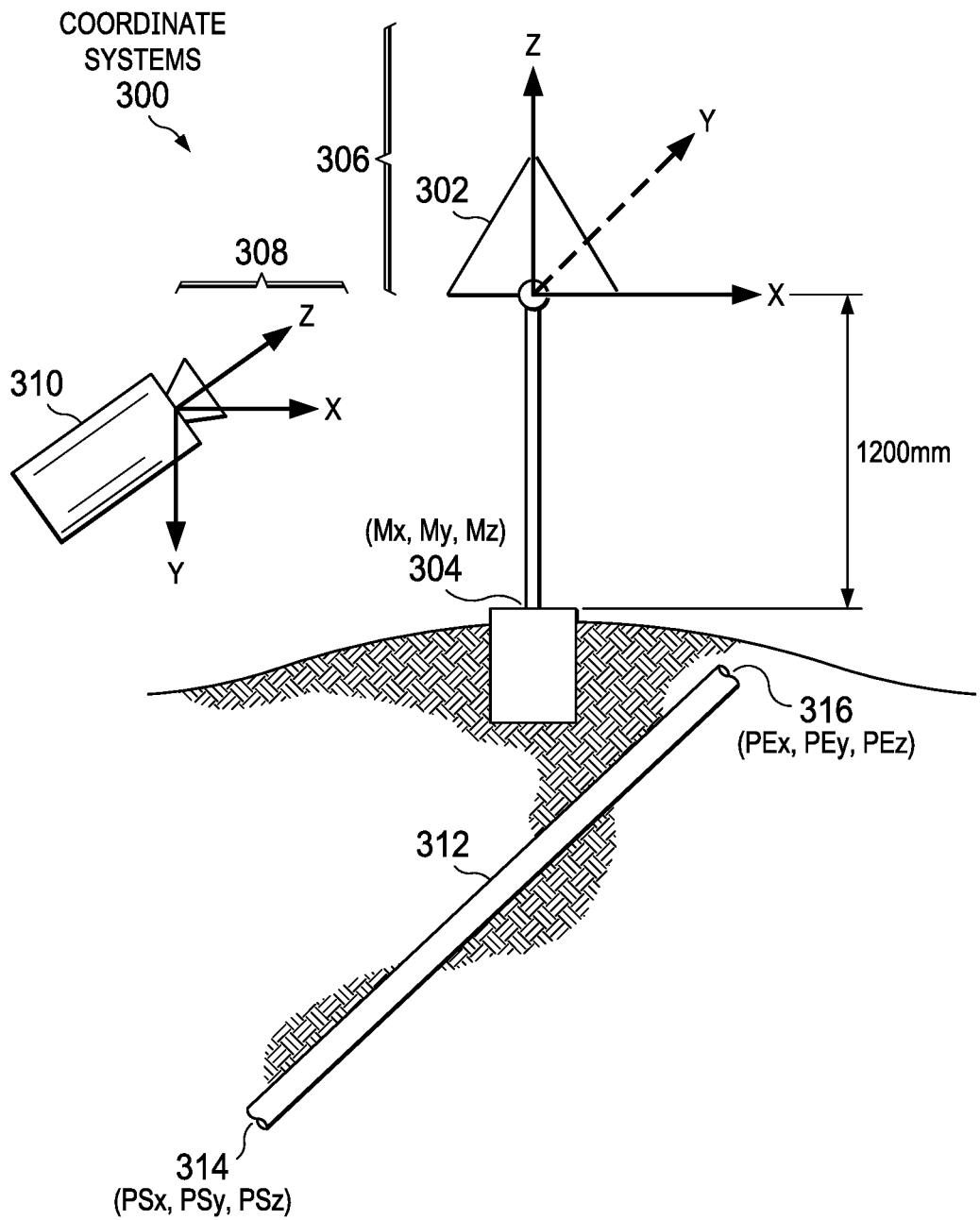
FIG. 3 is a diagram showing examples of coordinate systems, according to some implementations of the present disclosure.

FIG. 3 is a diagram showing examples of coordinate systems 300, according to some implementations of the present disclosure. A spatial location of the KM marker 302 can represent the spatial coordinates 304 of the fiducial marker (for example, with coordinates Mx, My, and Mz). The spatial coordinates 304 can be determined from spatial x/y/z coordinates 306 of the KM marker 302 and spatial x/y/z coordinates 308 of a camera 310. The spatial location of a pipeline segment 312 can be represented using x/y/z spatial coordinates of the start-points (S) and the end-points (E) of the buried pipeline (P). For example, the pipeline segment 312 can be represented by start-point coordinates 314 (PSx, PSy, PSz) and end-point coordinates 316 (PEx, PEy, PEz).

In some implementations, KM marker plates can have a standard height and can be installed (or placed) facing the direction of increasing stations of the buried pipeline. As a result, the relative orientation of the KM marker plate to the buried pipeline is known.

Transformation parameters between the spatial coordinate system and the local coordinate system of the fiducial marker can be obtained. Transformation parameters can be obtained using the spatial locations of the pipeline KM fiducial marker, the spatial location of the buried pipeline segment, and the relative orientation of the KM plate.

At 218, the relative position of the pipeline is used to calculate the relative position of the pipeline to the camera. For example, the relative location of the buried pipeline relative to the local coordinate system of the fiducial KM marker can be calculated (Δxs, Δys, Δzs) and (Δxe, Δye, Δze).

At 220, a 3D model of the pipeline is superimposed on the camera scene. For example, since the transformation between the local coordinate system of the fiducial marker and the camera coordinate system can be obtained by the AR system, the AR application can superimpose the accurate location of the pipeline segment on the real-world scene. Predefined 3D models for different types of pipelines can be used for better visualization.

Figure 4:
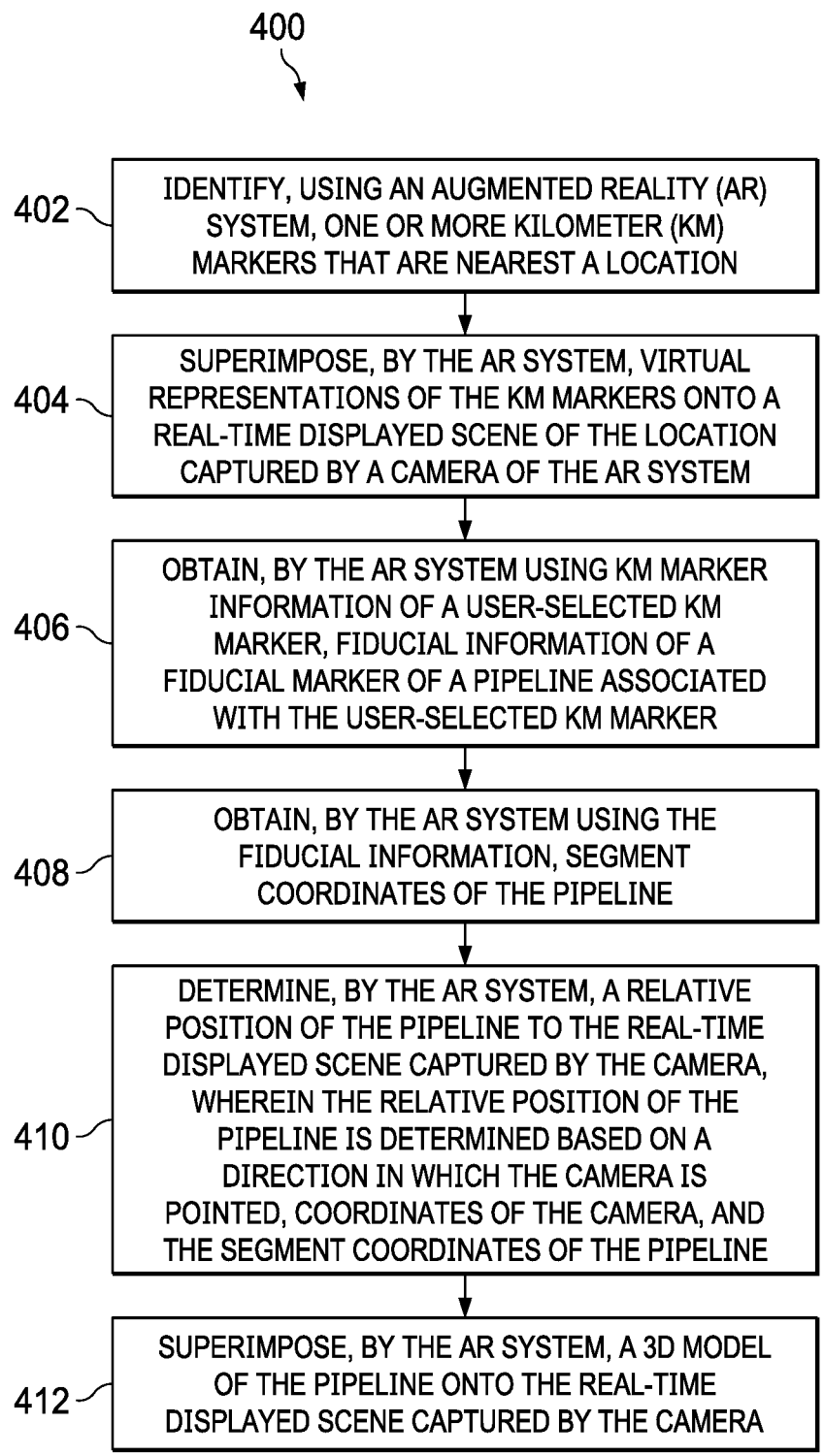
FIG. 4 is a flowchart of an example of a method for providing an augmented reality display, according to some implementations of the present disclosure.

FIG. 4 is a flowchart of an example of a method 400 for providing an augmented reality display, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, one or more kilometer (KM) markers that are nearest a location are identified using an AR system. For example, the AR system 110 can identify KM markers 114 in an area near the camera 108. In some implementations, identifying the one or more KM markers that are nearest the location can include comparing GPS coordinates of the location with GPS coordinates of the one or more KM markers. In some implementations, the virtual representations of the KM markers can be annotated with textual information corresponding to the KM markers. For example, text can be added to the display that includes particular KM marker information. From 402, method 400 proceeds to 404.

At 404, virtual representations of the KM markers are superimposed by the AR system onto a real-time displayed scene of the location captured by a camera of the AR system. For example, the display of the mobile device 106 can be augmented to include icons representing the KM markers 114 in the area. From 404, method 400 proceeds to 406.

At 406, fiducial information of a fiducial marker of a pipeline associated with a user-selected KM marker is obtained by the AR system using KM marker information of the user-selected KM marker. As an example, the user can select one of the KM markers. The fiducial information of the fiducial marker of the pipeline associated with the user-selected KM marker can be obtained. This can occur by capturing the fiducial marker using the camera, such as by pointing the camera 108 at the KM marker 114. From 406, method 400 proceeds to 408.

At 408, segment coordinates of the pipeline are obtained by the AR system using the fiducial information. For example, obtaining the segment coordinates of the pipeline can include accessing the GIS database 104 using the fiducial information of the fiducial marker. The segment coordinates of the pipeline can include, for each segment of the pipeline, the start-point coordinates 314 (PSx, PSy, PSz) and the end-point coordinates 316 (PEx, PEy, PEz). From 408, method 400 proceeds to 410.

At 410, a relative position of the pipeline relative to the real-time displayed scene captured by the camera is determined by the AR system. The relative position of the pipeline is determined based on a direction in which the camera is pointed, coordinates of the camera, and the segment coordinates of the pipeline. For example, determining the relative position of the pipeline relative to the real-time displayed scene captured by the camera can include determining x/y/z deltas between x/y/z camera coordinates of the camera and x/y/z coordinates of the start-point coordinates and the end-point coordinates. These deltas can be (Δxs, Δys, Δzs) and (Δxe, Δye, Δze), for example. From 410, method 400 proceeds to 412.

At 412, a 3D model of the pipeline is superimposed by the AR system onto the real-time displayed scene captured by the camera. For example, a 3D model of the pipeline can be determined based on the segment coordinates of the pipeline. After 412, method 400 can stop.

In some implementations, the AR application can be extended to recognize different shapes of pipeline markers and sign posts that are identified in the GIS database. Additionally, the AR application can be extended to recognize other types of markers, such as used for utilities. As a result, pipeline and other utilities companies can take advantage of the AR techniques, including developing their own solutions based on the techniques or by buying the AR application.

Figure 5:
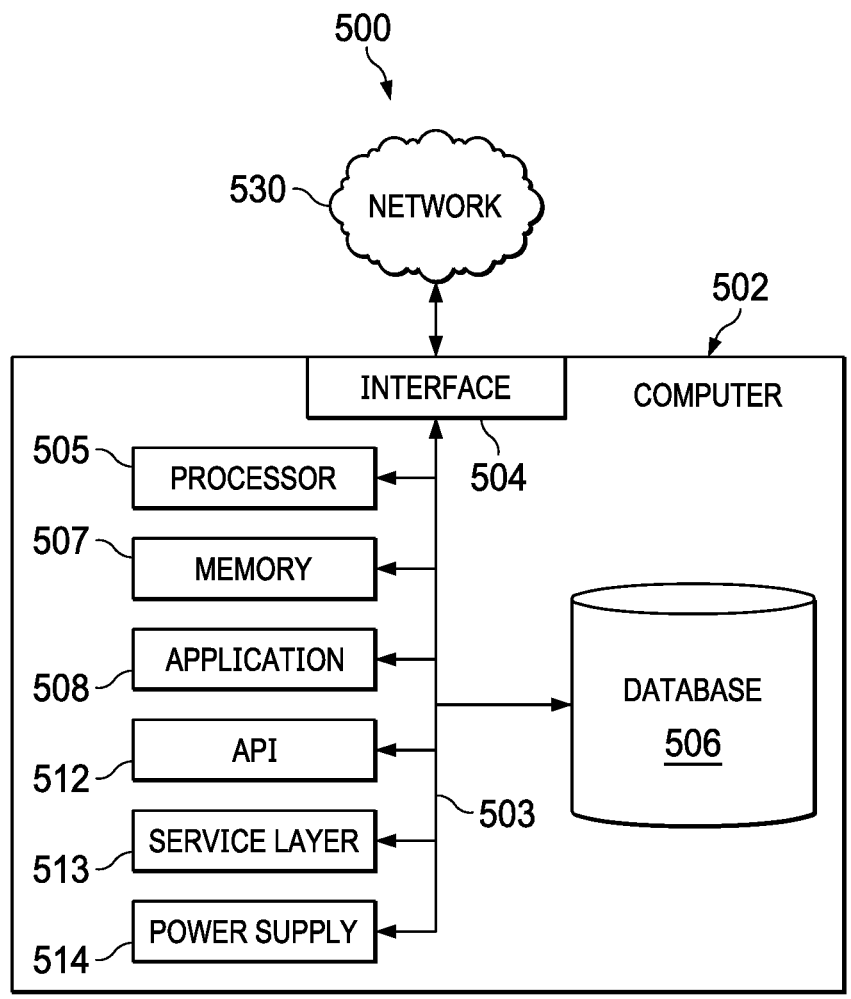
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. One or more kilometer (KM) markers that are nearest a location are identified using an AR system. Virtual representations of the KM markers are superimposed by the AR system onto a real-time displayed scene of the location captured by a camera of the AR system. Fiducial information of a fiducial marker of a pipeline associated with a user-selected KM marker is obtained by the AR system using KM marker information of the user-selected KM marker. Segment coordinates of the pipeline are obtained by the AR system using the fiducial information. A relative position of the pipeline relative to the real-time displayed scene captured by the camera is determined by the AR system. The relative position of the pipeline is determined based on a direction in which the camera is pointed, coordinates of the camera, and the segment coordinates of the pipeline. A 3D model of the pipeline is superimposed by the AR system onto the real-time displayed scene captured by the camera.

The foregoing and other described implementations can each, optionally, include one or more of the following features:

A first feature, combinable with any of the following features, the method further including annotating the virtual representations of the KM markers with textual information corresponding to the KM markers.

A second feature, combinable with any of the previous or following features, where obtaining the fiducial information of the fiducial marker of the pipeline associated with the user-selected KM marker includes capturing the fiducial marker using the camera.

A third feature, combinable with any of the previous or following features, where obtaining the segment coordinates of the pipeline includes accessing a geographical information system (GIS) database using the fiducial information of the fiducial marker.

A fourth feature, combinable with any of the previous or following features, where segment coordinates of the pipeline include, for each segment of the pipeline, start-point coordinates and end-point coordinates.

A fifth feature, combinable with any of the previous or following features, where determining the relative position of the pipeline to the real-time displayed scene captured by the camera includes determining x/y/z deltas between x/y/z camera coordinates of the camera and x/y/z coordinates of the start-point coordinates and the end-point coordinates.

A sixth feature, combinable with any of the previous or following features, the method further including determining the 3D model of the pipeline based on the segment coordinates of the pipeline.

A seventh feature, combinable with any of the previous or following features, where identifying the one or more KM markers that are nearest the location includes comparing global positioning system (GPS) coordinates of the location and GPS coordinates of the one or more KM markers.

In a second implementation, a non-transitory, computer-readable medium stores one or more instructions executable by a computer system to perform operations including the following. One or more kilometer (KM) markers that are nearest a location are identified using an AR system. Virtual representations of the KM markers are superimposed by the AR system onto a real-time displayed scene of the location captured by a camera of the AR system. Fiducial information of a fiducial marker of a pipeline associated with a user-selected KM marker is obtained by the AR system using KM marker information of the user-selected KM marker. Segment coordinates of the pipeline are obtained by the AR system using the fiducial information. A relative position of the pipeline relative to the real-time displayed scene captured by the camera is determined by the AR system. The relative position of the pipeline is determined based on a direction in which the camera is pointed, coordinates of the camera, and the segment coordinates of the pipeline. A 3D model of the pipeline is superimposed by the AR system onto the real-time displayed scene captured by the camera.

The foregoing and other described implementations can each, optionally, include one or more of the following features:

A first feature, combinable with any of the following features, the operations further including annotating the virtual representations of the KM markers with textual information corresponding to the KM markers.

A second feature, combinable with any of the previous or following features, where obtaining the fiducial information of the fiducial marker of the pipeline associated with the user-selected KM marker includes capturing the fiducial marker using the camera.

A third feature, combinable with any of the previous or following features, where obtaining the segment coordinates of the pipeline includes accessing a geographical information system (GIS) database using the fiducial information of the fiducial marker.

A fourth feature, combinable with any of the previous or following features, where segment coordinates of the pipeline include, for each segment of the pipeline, start-point coordinates and end-point coordinates.

A fifth feature, combinable with any of the previous or following features, where determining the relative position of the pipeline to the real-time displayed scene captured by the camera includes determining x/y/z deltas between x/y/z camera coordinates of the camera and x/y/z coordinates of the start-point coordinates and the end-point coordinates.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. One or more kilometer (KM) markers that are nearest a location are identified using an AR system. Virtual representations of the KM markers are superimposed by the AR system onto a real-time displayed scene of the location captured by a camera of the AR system. Fiducial information of a fiducial marker of a pipeline associated with a user-selected KM marker is obtained by the AR system using KM marker information of the user-selected KM marker. Segment coordinates of the pipeline are obtained by the AR system using the fiducial information. A relative position of the pipeline relative to the real-time displayed scene captured by the camera is determined by the AR system. The relative position of the pipeline is determined based on a direction in which the camera is pointed, coordinates of the camera, and the segment coordinates of the pipeline. A 3D model of the pipeline is superimposed by the AR system onto the real-time displayed scene captured by the camera.

The foregoing and other described implementations can each, optionally, include one or more of the following features:

A first feature, combinable with any of the following features, the operations further including annotating the virtual representations of the KM markers with textual information corresponding to the KM markers.

A second feature, combinable with any of the previous or following features, where obtaining the fiducial information of the fiducial marker of the pipeline associated with the user-selected KM marker includes capturing the fiducial marker using the camera.

A third feature, combinable with any of the previous or following features, where obtaining the segment coordinates of the pipeline includes accessing a geographical information system (GIS) database using the fiducial information of the fiducial marker.

A fourth feature, combinable with any of the previous or following features, where segment coordinates of the pipeline include, for each segment of the pipeline, start-point coordinates and end-point coordinates.

A fifth feature, combinable with any of the previous or following features, where determining the relative position of the pipeline to the real-time displayed scene captured by the camera includes determining x/y/z deltas between x/y/z camera coordinates of the camera and x/y/z coordinates of the start-point coordinates and the end-point coordinates.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   identifying, using an augmented reality (AR) system, one or more kilometer (KM) markers that are nearest a location;
   superimposing, by the AR system, virtual representations of the KM markers onto a real-time displayed scene of the location captured by a camera of the AR system;
   obtaining, by the AR system using KM marker information of a user-selected KM marker, fiducial information of a fiducial marker of a pipeline associated with the user-selected KM marker, wherein the fiducial marker is identified according to a standard shape recognizable by the AR system;
   obtaining, by the AR system using the fiducial information, segment coordinates of the pipeline, wherein the segment coordinates are based on spatial coordinates of the fiducial marker;
   determining, by the AR system, a relative position of the pipeline to the real-time displayed scene captured by the camera, wherein the relative position of the pipeline is determined based on a direction in which the camera is pointed, coordinates of the camera, and the segment coordinates of the pipeline; and
   superimposing, by the AR system, a three-dimensional (3D) model of the pipeline onto the real-time displayed scene captured by the camera.

2. The computer-implemented method of claim 1, further comprising annotating the virtual representations of the KM markers with textual information corresponding to the KM markers.

3. The computer-implemented method of claim 1, wherein obtaining the fiducial information of the fiducial marker of the pipeline associated with the user-selected KM marker includes capturing the fiducial marker using the camera.

4. The computer-implemented method of claim 1, wherein obtaining the segment coordinates of the pipeline includes accessing a geographical information system (GIS) database using the fiducial information of the fiducial marker.

5. The computer-implemented method of claim 1, wherein segment coordinates of the pipeline include, for each segment of the pipeline, start-point coordinates and end-point coordinates.

6. The computer-implemented method of claim 5, wherein determining the relative position of the pipeline to the real-time displayed scene captured by the camera includes determining x/y/z deltas between x/y/z camera coordinates of the camera and x/y/z coordinates of the start-point coordinates and the end-point coordinates.

7. The computer-implemented method of claim 1, further comprising determining the 3D model of the pipeline based on the segment coordinates of the pipeline.

8. The computer-implemented method of claim 1, wherein identifying the one or more KM markers that are nearest the location includes comparing global positioning system (GPS) coordinates of the location and GPS coordinates of the one or more KM markers.

9. A non-transitory, computer-readable medium storing one or more instructions executable by a computer system to perform operations comprising:
   identifying, using an augmented reality (AR) system, one or more kilometer (KM) markers that are nearest a location;
   superimposing, by the AR system, virtual representations of the KM markers onto a real-time displayed scene of the location captured by a camera of the AR system;

obtaining, by the AR system using KM marker information of a user-selected KM marker, fiducial information of a fiducial marker of a pipeline associated with the user-selected KM marker, wherein the fiducial marker is identified according to a standard shape recognizable by the AR system;

obtaining, by the AR system using the fiducial information, segment coordinates of the pipeline, wherein the segment coordinates are based on spatial coordinates of the fiducial marker;

determining, by the AR system, a relative position of the pipeline to the real-time displayed scene captured by the camera, wherein the relative position of the pipeline is determined based on a direction in which the camera is pointed, coordinates of the camera, and the segment coordinates of the pipeline; and superimposing, by the AR system, a three-dimensional (3D) model of the pipeline onto the real-time displayed scene captured by the camera.

10. The non-transitory, computer-readable medium of claim 9, the operations further comprising annotating the virtual representations of the KM markers with textual information corresponding to the KM markers.

11. The non-transitory, computer-readable medium of claim 9, wherein obtaining the fiducial information of the fiducial marker of the pipeline associated with the user-selected KM marker includes capturing the fiducial marker using the camera.

12. The non-transitory, computer-readable medium of claim 9, wherein obtaining the segment coordinates of the pipeline includes accessing a geographical information system (GIS) database using the fiducial information of the fiducial marker.

13. The non-transitory, computer-readable medium of claim 9, wherein segment coordinates of the pipeline include, for each segment of the pipeline, start-point coordinates and end-point coordinates.

14. The non-transitory, computer-readable medium of claim 13, wherein determining the relative position of the pipeline to the real-time displayed scene captured by the camera includes determining x/y/z deltas between x/y/z camera coordinates of the camera and x/y/z coordinates of the start-point coordinates and the end-point coordinates.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:

identifying, using an augmented reality (AR) system, one or more kilometer (KM) markers that are nearest a location;

superimposing, by the AR system, virtual representations of the KM markers onto a real-time displayed scene of the location captured by a camera of the AR system;

obtaining, by the AR system using KM marker information of a user-selected KM marker, fiducial information of a fiducial marker of a pipeline associated with the user-selected KM marker, wherein the fiducial marker is identified according to a standard shape recognizable by the AR system;

obtaining, by the AR system using the fiducial information, segment coordinates of the pipeline, wherein the segment coordinates are based on spatial coordinates of the fiducial marker;

determining, by the AR system, a relative position of the pipeline to the real-time displayed scene captured by the camera, wherein the relative position of the pipeline is determined based on a direction in which the camera is pointed, coordinates of the camera, and the segment coordinates of the pipeline; and superimposing, by the AR system, a three-dimensional (3D) model of the pipeline onto the real-time displayed scene captured by the camera.

16. The computer-implemented system of claim 15, the operations further comprising annotating the virtual representations of the KM markers with textual information corresponding to the KM markers.

17. The computer-implemented system of claim 15, wherein obtaining the fiducial information of the fiducial marker of the pipeline associated with the user-selected KM marker includes capturing the fiducial marker using the camera.

18. The computer-implemented system of claim 15, wherein obtaining the segment coordinates of the pipeline includes accessing a geographical information system (GIS) database using the fiducial information of the fiducial marker.

19. The computer-implemented system of claim 15, wherein segment coordinates of the pipeline include, for each segment of the pipeline, start-point coordinates and end-point coordinates.

20. The computer-implemented system of claim 19, wherein determining the relative position of the pipeline to the real-time displayed scene captured by the camera includes determining x/y/z deltas between x/y/z camera coordinates of the camera and x/y/z coordinates of the start-point coordinates and the end-point coordinates.

* * * * *